UNITED STATES PATENT OFFICE.

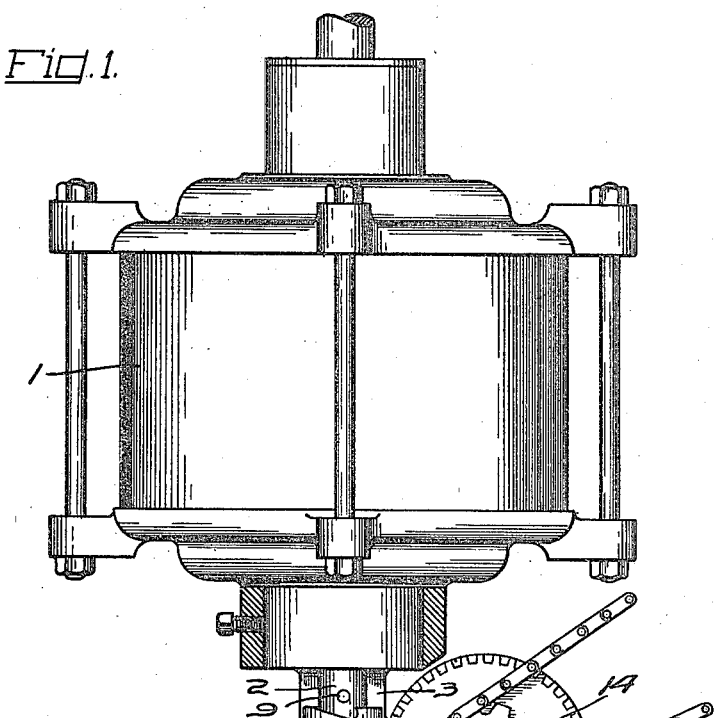
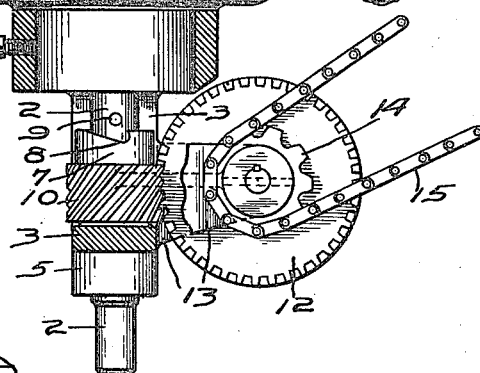
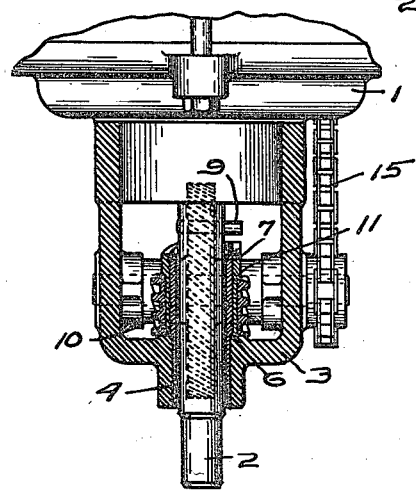

THOMAS J. MURPHY, OF ROCHESTER, NEW YORK.

STARTER.

1,283,267. Specification of Letters Patent. Patented Oct. 29, 1918.

Application filed December 29, 1916. Serial No. 139,566.

*To all whom it may concern:*

Be it known that I, THOMAS J. MURPHY, a subject of the King of Great Britain, and a resident of Rochester, in the county of Monroe and State of New York, have invented a certain new and useful Starter; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a means for starting a motor, particularly for starting a synchronous motor.

The object of the invention is to provide a means that may be operated to bring the speed of the rotor of the motor up to synchronism with the alternating current. By my invention is provided a means whereby clutch engagement between the starting means and the shaft of the rotor will be automatically produced.

The invention may be contained in many forms of constructions usable for different purposes, all of which come within the purview of my claims hereinafter appended. To show the practicability of my invention I have selected one of such constructions as an example and shall describe it hereinafter. The construction selected is for bringing the rotor of a synchronous motor up to synchronism with the alternations of an alternating current which operates the motor. It is illustrated in the accompanying drawings.

Figure 1 of the drawings is a side view of the rotor and of the starting mechanism which is shown partly in section and in broken view. Fig. 2 is a vertical sectional view of the starting mechanism.

1 is the synchronous motor, the rotor of which is connected to the shaft 2. The shaft 2 freely moves in a depending bracket 3. A bushing 4 is supported in the bracket 3 and a boss 5 formed at the lower end of the bracket. It may be held in position by a suitable shoulder 6 cut in the bushing 4. A clutch member 7, somewhat tightly fitting the bushing 4, is located around the bushing. The fit of the clutch member 7 on the bushing 4 is sufficient to give the desired friction to the rotation of the clutch member, as hereinafter more fully described. The upper end of the clutch member 7 is provided with the engaging recess 8 of the type usually found in clutch members of the character shown, while the shaft 2 is provided with a pin 9 with which the clutch member 7 engages, so that when the clutch member 7 is raised sufficiently the pin 9 is locked in the recess 8, but when rotation of the clutch member 7 ceases the pin 9 rides on the inclined surface of the recess and forces the clutch member 7 down, whereupon the shaft 2 may continue to rotate by the operation of the motor.

A worm 10 is secured to the clutch member 7. If desired, the clutch member 7 may be provided with a shoulder 11 which rests against the upper edge of the worm 10. The worm 10 is provided with thread preferably having an inclination of 45° relative to the axis of the worm. This, however, may be varied in order to cause engagement between the clutch member and the pin 9, as hereinafter described.

A worm wheel 12 operates upon the worm 10. The worm wheel 12 is pivotally supported in arms 13 which extend from the bracket 3. If desired, a sprocket pinion 14 may be keyed to the shaft of the worm wheel 12 and may be operated by a sprocket chain 15. The sprocket chain 15 may be operated by a sprocket wheel and a crank, in order to produce the desired speed of rotation in the worm wheel 12 and in the clutch member 7, that is, to cause the rotor to rotate at a speed substantially equal to the rate of alternations of the electric current which operates the motor.

In the operation of the starting mechanism the worm wheel 12 operating upon the worm 10 not only causes rotation of the worm 10 but, by reason of the friction between the teeth or thread of the worm wheel 12 and the worm 10, which varies according to the pitch of the teeth, the worm 10 and the clutch member are lifted along the bushing 4. Friction between the bushing 4 and the clutch member 7 also causes sufficient resistance to the rotation of the worm 10 and causes sufficient friction between the teeth or thread of the worm and the worm wheel to cause the worm wheel to lift the worm and the clutch member 7, so that when the worm wheel 12 is rotated by any suitable means the clutch member 7 will automatically be raised to position of engagement with the coacting clutch member or pin 9, which is secured to the shaft of the rotor, and upon further rotation of the worm wheel 12 the rotor will be rotated until synchronism is reached, whereupon the electric current will operate the rotor and relieve it from the clutch member 7 and automatically disconnect the starting mechanism from the shaft of the rotor.

The construction selected and described may be greatly modified in the arrangement and manufacture of its parts, and in the substitution of elements having equivalent functions, and such modifications may be used for various purposes and still contain the invention.

I claim:

1. In a starting mechanism, a spindle having a clutch engaging part, a clutch member, a sleeve surrounding the spindle, a bushing located on the sleeve, a worm surrounding the bushing, a worm wheel for causing rotation of the worm and lifting the worm and the clutch member to engage the clutch engaging part.

2. In a starting mechanism, a spindle, means for supporting the spindle, the spindle having a clutch engaging part, a clutch member surrounding the spindle, a worm connected to the clutch member and movable along the spindle, a worm wheel for lifting the worm and the clutch engaging member.

3. In a starting mechanism, a spindle having a clutch engaging part, a clutch member rotatable on and movable along the spindle, a worm connected to the clutch member, a worm wheel for lifting the worm and clutch member to cause engagement between the clutch member and the clutch engaging part.

In testimony whereof, I have hereunto signed my name to this specification.

THOMAS J. MURPHY.